United States Patent
Ericson et al.

(10) Patent No.: US 7,054,487 B2
(45) Date of Patent: May 30, 2006

(54) CONTROLLING AND ELECTRONIC DEVICE

(75) Inventors: Petter Ericson, Malmo (SE); Henrik Hoglind, Lund (SE)

(73) Assignee: Anoto IP LIC Handelsbolag, Lund (SE)

( * ) Notice: Subject to any disclaimer, the term of this patent is extended or adjusted under 35 U.S.C. 154(b) by 782 days.

(21) Appl. No.: 09/784,550

(22) Filed: Jun. 4, 2001

(65) Prior Publication Data

US 2001/0035861 A1 Nov. 1, 2001

Related U.S. Application Data

(60) Provisional application No. 60/208,164, filed on May 31, 2000, provisional application No. 60/208,169, filed on May 31, 2000.

(30) Foreign Application Priority Data

Feb. 18, 2000 (SE) .................................... 0000541
Mar. 21, 2000 (SE) .................................... 0000939

(51) Int. Cl.
*G06K 9/00* (2006.01)
(52) U.S. Cl. ...................... 382/181; 382/305; 358/401; 348/168
(58) Field of Classification Search ................ 382/181, 382/305; 358/401; 348/168
See application file for complete search history.

(56) References Cited

U.S. PATENT DOCUMENTS

| | | | |
|---|---|---|---|
| 4,588,282 A | * | 5/1986 | Levine ........................ 358/473 |
| 4,797,544 A | | 1/1989 | Montgomery et al. |
| 4,804,949 A | * | 2/1989 | Faulkerson ................. 345/166 |
| 5,477,012 A | | 12/1995 | Sekendur |
| 5,574,804 A | * | 11/1996 | Olschafskie et al. ........ 382/313 |

(Continued)

FOREIGN PATENT DOCUMENTS

WO          WO9820446          5/1998

(Continued)

OTHER PUBLICATIONS

Webpage entitled: "Sänd fax, e-post och SMS direkt från din C-Pen" http://www.cpen.com/news/pressrelease/99923bsv.shtml, Sep. 23, 1999.

*Primary Examiner*—Sheela Chawan
(74) *Attorney, Agent, or Firm*—Birch, Stewart, Kolasch & Birch, LLP

(57) ABSTRACT

An electronic device (200), such as a computer, a mobile phone or a PDA, is controlled by an arrangement comprising a handheld input unit (300), which records images and converts these to text strings comprising character sequences. The text strings recorded by the input unit (300) are used when controlling the electronic device (200). A signal-processing unit (210) receives the text strings, matches the format of a current text string to a format database comprising predetermined formats, each of which is associated with a command, and generates the command associated with the current text string, so as to control the electronic device (200). The signal-processing unit (210) can search for an address in the current text string. If an address is found, the signal-processing unit (210) causes the electronic device (200) to connect to the address. The input unit, which is capable of operating in different function modes, such as a mouse function mode and a text inputting mode, is arranged to automatically change between the different function modes on the basis of the contents of the recorded images, typically in identification of a predetermined pattern.

32 Claims, 2 Drawing Sheets

U.S. PATENT DOCUMENTS

| | | | |
|---|---|---|---|
| 5,852,434 A | 12/1998 | Sekendur | |
| 5,870,723 A * | 2/1999 | Pare et al. | 705/39 |
| 5,932,863 A | 8/1999 | Rathus et al. | |
| 6,040,829 A * | 3/2000 | Croy et al. | 345/864 |
| 6,128,007 A * | 10/2000 | Seybold | 345/179 |
| 6,259,449 B1 * | 7/2001 | Saxena et al. | 345/853 |
| 6,269,336 B1 * | 7/2001 | Ladd et al. | 704/270 |

FOREIGN PATENT DOCUMENTS

| | | |
|---|---|---|
| WO | WO-9950787 | 10/1999 |
| WO | WO9960467 | 11/1999 |
| WO | WO9960468 | 11/1999 |
| WO | WO9960469 | 11/1999 |
| WO | WO0025293 | 5/2000 |
| WO | WO0073983 | 12/2000 |

* cited by examiner

CONTROLLING AND ELECTRONIC DEVICE

CROSS REFERENCE TO RELATED APPLICATION

This application claims the benefit of U.S. Provisional Patent Application No. 60/208,164 filed May 31, 2000 and U.S. Provisional Patent Application No. 60/208,169 filed May 31, 2000.

FIELD OF THE INVENTION

This invention concerns an arrangement and a method for controlling an electronic device starting from images of a base. The invention also concerns an input unit for inputting images from a base.

BACKGROUND OF THE INVENTION

The Applicant's Patent Publication No. WO98/20446 discloses a reading pen which can be used for recording text by imaging this from a base. The reading pen has an optical sensor which records a number of images, with partially overlapping contents, of the text which is to be recorded. In addition, the reading pen has a processor which puts together the images, identifies the text in the images and stores it in character-coded format. The text can then be transferred to a computer with which the reading pen communicates.

In addition, the Applicant's Patent Publication No. WO99/60469 discloses an optical mouse which is arranged to position a cursor on a display of a computer.

The reading pen and the optical mouse are two examples of input units which can be used to input information into a computer and to control the function of a computer. Another example of an input unit is a keyboard, which can be used both to enter information and to control the computer by means of various keyboard commands.

A user does not want to have to change between different input units in order to be able to carry out different functions. Therefore it is a general requirement that each input unit is to be able to be used for as many different functions as possible and in no flexible and simple a way as possible for the user.

U.S. Pat. No. 5,932,863 discloses an arrangement for accessing electronic information via printed matter. More specifically, the arrangement comprises an input unit which via a keypad is switchable between a scanner mode and a mouse mode. In the scanner mode, a user can input an image of a dedicated object on the base, more specifically a bar code, a character or a symbol. The image is transferred from the input unit to a computer, which decodes the image and which, as a result, executes a preprogrammed command, for instance to obtain interactive software from an external database and executing this software on the computer. During execution, the user can, by operating the keypad, change the input unit to the mouse mode in order to interact with the software on a display.

A problem of inputting this type of dedicated objects is that the object must in many cases be accompanied by some sort of explanatory text, so that the user can understand which command is initiated by the object. In spacious order catalogues this can usually be provided, but in many other cases the space is more restricted. Therefore the user may have to learn to what each object relates, which however reduces the usability of the arrangement if it is to be generalized beyond a certain application, such as programming a television set.

SUMMARY OF THE INVENTION

An object of this invention is to additionally improve prior-art input units. More specifically it is an object to provide a general and flexible technique for controlling an electronic device. The provided technique should be intuitive to the user.

This object is achieved by an arrangement according to claim 1 and a method according to claim 22. The dependent claims define preferred embodiments.

According to a first aspect, this invention concerns an arrangement for controlling an electronic device, said arrangement comprising an input unit with an optical sensor for recording images, and a signal-processing unit for identifying predetermined information in at least one of said images and for controlling the electronic device dependent upon the predetermined information. The input unit is arranged, in a first function mode, to convert at least one image to a current text string containing a sequence of characters, and the signal-processing unit is arranged to control the electronic device on the basis of the current string.

According to the invention the arrangement for controlling an electronic device is based on an input unit function known per se, that is recording of text, which, however, is modified by making the signal-processing unit control the electronic device on the basis of the current text string that is recorded. A user can thus control the electronic device on the basis of text which is read using the input unit. This is a great advantage since the command indication can be printed or written in more or less clear text on a bass, whereby the control of the electronic device takes place in a way that is transparent and intuitive to the user. Moreover, such text-based command indications can be incorporated into a running text, without affecting the lay-out of the text. In order to facilitate the user's identification of commands, these may, however, be marked somehow, for instance by using a divergent font, a divergent color, underlining etc.

The inputting of text into the inventive arrangement can advantageously be accomplished in the same way as in the Applicant's above-mentioned patent publication, although other accomplishments within the scope of prior art are also feasible. The optical sensor can be a line sensor, but is advantageously an area sensor.

The signal-processing unit is preferably accomplished as software. However, it may consist of a specially adapted hardware circuit, for instance an ASIC, an FPGA etc, or a suitable combination of hard software and hardware.

The electronic device controlled by means of the arrangement can be a computer, a mobile phone, a PDA, or a similar electronic device.

The command indication can correspond to a command to the electronic device at system or application level. The command can be, for instance, to emulate a keyboard command. Alternatively, it can also be a special command, for example a user-defined command.

Besides command indications in clear text, the electronic device can also be controlled by text which is used in specific applications in the electronic device, such as addresses. The content of these addresses varies, but the arrangement is suitably arranged to identify the format of the current text string and, starting from this, interpret to what the text string relates. By "format" is meant the overall layout of the text string, such as presence and location of one or more given characters or character combinations in a text string, The arrangement conveniently comprises a format database containing predetermined formats, to which the inputted text string is matched to determine whether a command is to be executed, and in that case which one. The arrangement advantageously also comprises a database editor which allows the user to introduce formats and associated commands into the format database. It is particularly preferred for these commands to initiate execution of software on the electronic device. Of course, such an editable database may also comprise a set of regular text strings (command indications) which are matched in their entirety to the recorded text and which are each associated with a command.

The use of a format database means that the arrangement, which with the input unit in its first function mode is arranged to input text, comprises an intelligent filter which interprets the inputted text in order to identify commands therein. The filter is intelligent to such an extent that it does not necessarily require identical correspondence between the inputted text string and a text string in said database in order to identify a command. The use of such an intelligent filter gives several advantages. When necessary, the arrangement, with the input unit in one and the same function mode, can be used both to input text into the electronic device and to control the same. Moreover, the electronic device can be controlled, using at least part of the current text string, as will be described in more detail below.

In a particularly preferred embodiment, the text string comprises an address. The format database thus comprises predetermined formats for different types of addresses and the signal-processing unit is arranged to identify an address in the current text string and cause the electronic device to directly or indirectly connect to the address.

In a particularly preferred embodiment, the signal-processing unit is arranged to cause, when identifying an address for electronic mail in the recorded text, the electronic device to open a program for electronic mail. Preferably, the arrangement causes the device not only to open the program but also to open a template for electronic mail. It is still more preferred that the template is opened with the recorded e-mall address entered in the address field. It is also conceivable that the input unit is connected to the message field of the template, so that the input unit can be used to input message text, for instance by scanning of text or inputting of text, if the input unit has such a function mode.

The identification of an e-mail address format can take place, for example, by recognition of the at sign (@), the signal processing unit interpreting all characters which are associated with the at sign as part of the address.

Furthermore tho signal processing unit can advantageously be arrange to cause, when identifying a web address in the recorded text, the electronic device to open a web browser. Preferably, the device is caused not only to open the browser, but also the web page corresponding to the web address. The signal-processing unit's identification of a web address format can, for example, be based on recognition of the character combination "http://" or "www", the signal-processing unit interpreting all characters which are associated with said character combination as part of the web address. In this way, the user can easily and quickly open a web page by using the same input unit as he or she uses for other input functions.

The signal-processing unit can also advantageously be arranged to cause, when identifying a phone number in the recorded text, the electronic device to call the phone number.

The arrangement according to the invention is easy to use for the user who need only move the input unit over text or place it on text in order to control the electronic device. The text can be self explanatory, which means that the arrangement will be intuitive to the user. The arrangement is also general and flexible, in that the electronic device can be controlled on the basis of the format of an inputted text string, and by using at least part of the text string.

The arrangement can also easily be combined with other input unit functions which are based on recording of images by means of an optical sensor.

In an advantageous embodiment, the arrangement also comprises an optical mouse function for controlling a cursor on a display of the electronic device. The user can then carry out mouse functions using the arrangement and also control the electronic device by recording text. The mouse function is advantageously integrated into the input unit and realized in the same way as the Applicant's above-mentioned patent publication. Other realizations within the scope of prior-art technique are, however, also possible.

As mentioned above, the signal-processing unit can generate a predetermined command when recognizing one or more predetermined characters or words in the recorded text. The predetermined words can simply be designations of the commands that are generated. To this end, the arrangement may advantageously comprise a product on which a plurality of command indications are stated. The command indications can advantageously be indicated by character combinations which are easy for the user to understand. The product can be, for example, a mouse pad.

In another advantageous embodiment, the arrangement comprises, alternatively or additionally, a handwriting/handdrawing function for inputting of handwritten information into the electronic device. The handwriting/handdrawing function is advantageously integrated into the Input unit and realized in the same way as in the Applicant's Patent Publication WO99/60467. Other realizations within the scope of prior-art technique are, however, also possible.

In one embodiment, the signal-processing unit is at least partially located in the same casing as the electronic device. As a result, the input unit can be made simpler and cheaper. In addition, the processor capacity which is already available in the electronic device can be used to carry out the functions of the signal-processing unit. Certain processing of tho recorded text can, however, advantageously be carried out in the input unit, for example localization of the texts in the image or images and conversion of the text to character coded format, for example ASCII code, so that a smaller amount of information needs to be transmitted from the input unit to the electronic device.

In another embodiment the signal-processing unit can be completely integrated with the input unit so that the electronic device receives one or more commands directly from the input unit. In another embodiment the input unit can just record images and transfer these to the signal-processing unit which carries out all the processing of the images.

The input unit can be arranged to communicate with the electronic device by wireless means, so that the use of the input unit is as flexible as possible and so that certain functions can be used stand-alone, Alternatively, communication via a cable could be possible, for example via a USB.

According to one more embodiment, the input unit functions in the first function mode as a handheld text scanner and the signal-processing unit is arranged to continually interpret the text content of the images recorded by the optical sensor. To prevent words which are only intended to be inputted and stored in the electronic device, but which consist of the same character combination as a command indication, from being interpreted as a command, it is possible to place additional demands on what the signal-processing unit is to interpret as commands. For instance, it may ba required that command indications consist of characters in special font, special size, printed in capital letters, underlined, printed in extra bold type or in italics etc.

Alternatively, the arrangement is designed in such manner that it can selectively be caused to operate in a control function mode, in which the signal-processing unit is arranged to control the electronic device on the basis of the current text string. The embodiment has the advantage that it simplifies the arrangement since it just has to interpret text in the control function mode. The risk that text which is only intended to be inputted and stored in the electronic device is erroneously interpreted as a command is also eliminated.

An input unit with a plurality of function modes is in one embodiment arranged to automatically select the function mode on the basis of the content of one or more images, i.e. by identifying some kind of predetermined information. The predetermined information can in principle be any information which makes it possible for the input unit to interpret that it is to change from a current function mode to a new function mode. The information can, for example, consist of one or more predetermined characters, symbols, words, text in special font or line thickness or the like. When the input unit identifies the predetermined information, it automatically changes to the required function mode. In this way the user does not need to press any buttons.

In a preferred embodiment, the predetermined information is a predetermined pattern. If the input unit, for example, has a mouse function mode and a control function mode, it can be programmed to be able to identify the pattern an a mouse pad. When the user places the input unit on the mouse pads, it records an image of the pattern on the mouse pad. The input unit identifies the pattern as predetermined information which indicates mouse function and it changes automatically to mouse function mode and processes the images to achieve the mouse function.

It is, of course, convenient if the input unit is also arranged to change from the mouse function mode to the control function mode when it detects other predetermined information. If the input unit has only a mouse function mode and a control function mode, it can, for example, change back from the mouse function mode to the control function mode when it detects that the predetermined pattern for the mouse function mode is no longer present in the captured images. Alternatively, the change can be carried out on the basis of positive identification of a certain piece of predetermined information.

This automatic change between different function modes can, of course, be used independently of how many and which function modes the input unit comprises. As mentioned above, the input unit may, for example, comprise a control function mode, a text inputting mode (scanner function mode), a mouse function mode and a handwriting recording mode.

The input unit may also comprise a photographing mode, in which it can be caused, like a camera, to record and store single images.

In an advantageous embodiment, the predetermined information consists of a position-coding pattern, preferably an absolute position-coding pattern.

The advantage of a position-coding pattern is that the predetermined information can consist of one or more specific positions. This makes it easier for the device to identify when it is to change, as it does not need to carry out any character recognition (OCR).

Absolute position-coding patterns are known, for example, from U.S. Pat. No. 5,852,434 and the Applicant's Patent Publication WO00/73983 which was not publicly available at the time of the filing the Swedish patent application from which the present application claims priority, According to a second aspect, the present invention relates to a method for controlling an electronic device, comprising the steps of operating a handheld input unit to record at least one image, identifying predetermined information in said at least one image, and controlling the electronic device dependent upon said predetermined information. In this method, said at least one image in converted to a current text string which comprises a sequence of characters, and the electronic device is controlled on the basis of the current text string.

The advantages of this method are evident from the above discussion of the arrangement. The features of the arrangement are, where appropriate, applicable also to the method.

The Applicant's Patent Publication WO00/60468 discloses an input unit which has an image-based mouse function mode and an image based input function mode. The input unit is changed by the user pressing buttons.

A further object is to generally simplify the use of an input unit which has two function modes, so that the change between different function modes can be carried out in a way that is smooth for the user. This object is achieved by an input unit according to claim 28. The dependent claims define preferred embodiments.

More specifically, the invention comprises according to a third aspect an input unit which has at least a first and a second function mode. The input unit comprises a detector for capturing of images, for instance and optical sensor, and an image processing device, for instance a processor, for processing the images to achieve said two function modes. The input unit is arranged to change from the first to the second function mode when the image processor detects a first piece of predetermined information in one of said images.

Like in the arrangement for controlling an electronic device, the predetermined information can in principle be any information which makes it possible for the input unit to interpret that it is to change from a current function mode to a new function mode. The information can, for example, consist of one or more predetermined characters, symbols, words, text in special font or line thickness or the like. When the input unit identifies the predetermined information, it automatically changes to the required function mode. In this way, the user does not need to press any buttons.

In a preferred embodiment, the predetermined information is a predetermined pattern. If the input unit, for example, has a mouse function mode and another function mode, it can be programmed to be able to identity the pattern on a mouse pad. When the user places the input unit on the mouse pad, the detector records an image of the pattern on the mouse pad. The image processor identifies the pattern as predetermined information which indicates mouse function and it then changes automatically to the mouse function mode and processes the images to achieve the mouse function.

Of course, it is convenient for the input unit also to be arranged to change from the second function mode to the first function mode when it detects a second piece of predetermined information, if the input unit just has a mouse function mode and an input function mode, it can, for example, change back from the mouse function mode to the input function mode when the image processor detects that the predetermined pattern for the mouse function mode is no longer present in the recorded images. Alternatively, the change can take place on the basis of positive identification of another predetermined pattern.

In an advantageous embodiment, the predetermined information consists of a position-coding pattern, preferably an absolute position-coding pattern. The advantage of this is evident from the above discussion of the arrangement for controlling an electronic device.

The functions between which the change takes place can, for example, be a mouse function mode, a scanner function mode, a handwriting recording mode, a photographing mode or some similar function mode which can be achieved on the basis of captured images.

BRIEF DESCRIPTION OF THE DRAWINGS

This invention will now be described in greater detail by means of an embodiment with reference to the accompanying drawings, in which FIG. 1 schematically illustrates the composition and use of an arrangement according to the invention.

DESCRIPTION OF A PREFERRED EMBODIMENT

An embodiment of an arrangement is described below which comprises a mouse function mode, a scanner or reading pen function mode and a control function mode which is based on text recording.

Figure 1:
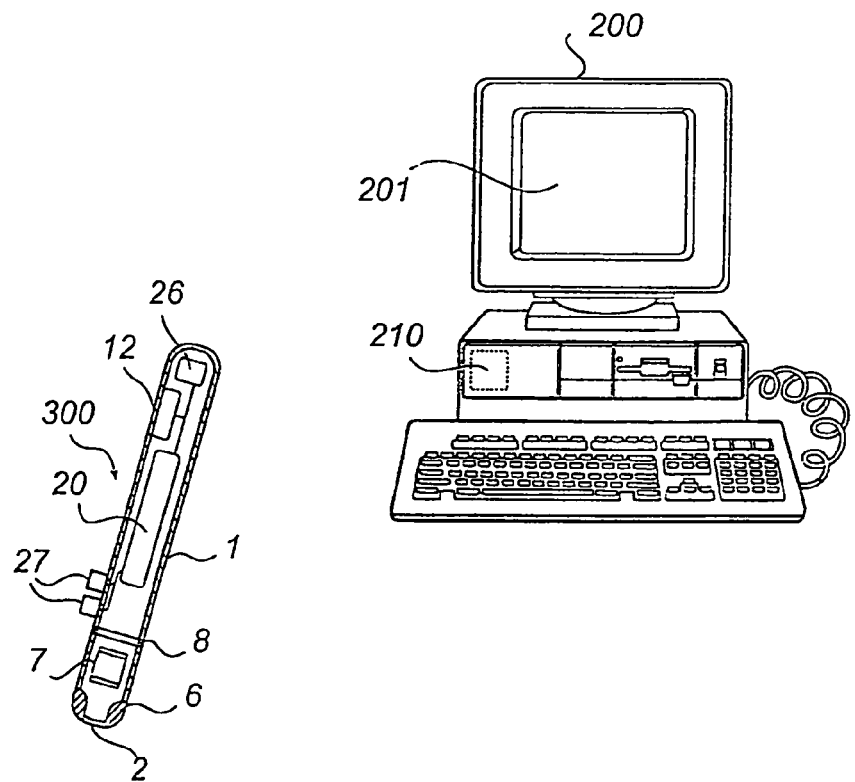
Figure 1:
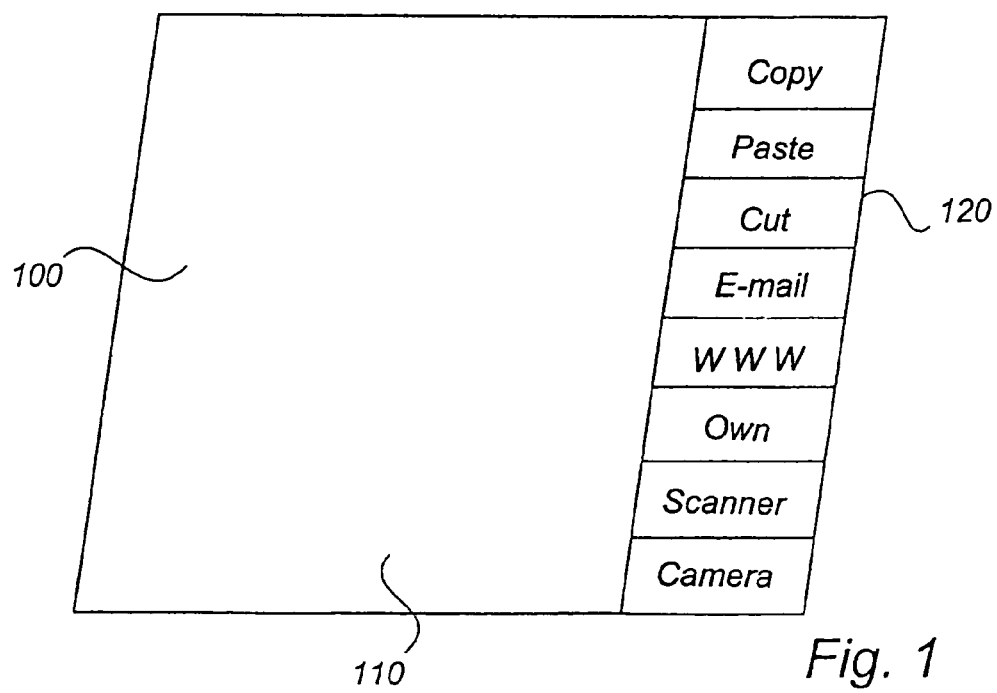

FIG. 1 shows a mouse pad 100, an electronic device 200 in the form of a computer and an input unit 300 for the computer.

The mouse pad 100 has a working field 110 with an irregular pattern (not shown) which makes it possible to determine the relative positions of two images which have partially overlapping contents by means of the contents of the images, and a command field 120, in which number of predetermined command indications are stated.

The input unit 300 has a casing 1 in the shape of a pen. One short side of the casing 1 has a window 2 through which images are captured for the different image-based function modes of the input unit 300.

The casing 1 contains principally an optics part, an electronics part and a power supply.

The optics part comprises a number of light emitting diodes 6, a lens system 7 and an optical sensor 8 which constitutes the interface with the electronics part. The light emitting diodes 6 are intended to illuminate a surface face of the base which is at the moment below the window. The lens system 7 is intended to project an image of the surface which is below the window 2 onto the light-sensitive sensor 8 is as correct a way as possible. The optical sensor 8 can consist of an area sensor, such as a CMOS sensor or a CCD sensor with a built-in A/D transducer. Such sensors are commercially available.

in this example, the power supply for the input unit is obtained from a battery 12 but can alternatively be obtained from a mains connection (not shown).

The electronics part comprises a processor 20 with conventional associated circuits, such as various types of memory, and associated programs for carrying out the functions described here. The electronics part also comprises a transceiver 26 for transmitting information to/from the computer 200. The transceiver 26 can be based on infrared technology, ultrasonics or radio technology for transmission over short distances, for example in accordance with the Bluetooth standard. The electronics part further comprises buttons 27, by means of which the user can control the input unit 300 and in particular change the input unit between the mouse function mode, the scanner function mode and the control function mode. When the input unit 300 operates in the mouse function mode, the buttons 27 can also have functions which correspond to the click buttons on a traditional mouse.

The computer 200 is an ordinary personal computer with circuits and programs which make possible communication with the input unit 300. However, in this embodiment this also contains a signal-processing unit which constitutes part of the arrangement for controlling its function. Tho signal processing unit consists in this example of a program which is installed in the computer 200. This is shown symbolically by broken lines and reference numeral 210.

As mentioned, the input unit 300 has a scanner function mode, a mouse function mode and a control function mode.

The scanner function mode is used to record text. The user passes the input unit 300 across the text which he wants to record. The optical sensor 8 records images with partially overlapping contents. The images are put together by the processor 20, each character in the put-together image is localized and, using for example neural network software in the processor 20, its corresponding ASCII characters are determined. The text converted in this way to character-coded format can be stored, in the form of a text string, in the input unit 300 or transferred to the computer 200. The scanner function is described in greater detail in the Applicant's Patent Publication No. WO98/20446, which is incorporated herein by reference.

The mouse function mode is used to control a cursor on the display 201 of the computer 200. The mouse function mode is also image based in this embodiment. When the input unit 300 is moved across the working field 110, the optical sensor 8 records a plurality of images with partially overlapping images. The processor 20 determines positioning signals for the cursor of the computer 200 on the basis of the relative positions of the recorded images, which are determined by means of the contents of the images. The mouse function is described in greater detail in the Applicant's Patent Publication No. WO99/60469, which is incorporated herein by reference.

The control function mode is based on the scanner function. The user records text in the same way as in the scanner function mode. The text is sent in character coded format from the input unit's 300 transceiver 26 to the signal-processing unit 210 in the computer 200, together with an indication that this is control information which is to be interpreted. The signal-processing unit 210 examines the received text and searches for predetermined information in this in the form of predetermined characters and character combinations. When such predetermined information is found, the signal-processing unit 210 creates predetermined commands to the computer 200 as a function of the predetermined information.

The arrangement described above is used in the following way. First assume that the user wants to use the input unit 300 as a mouse. He selects the mouse function mode by means of the buttons 27. By moving the input unit 200 on the working field 110 he controls the cursor on the display 201 of the computer 200. Assume next that the user edits a document in the computer 200. He can then mark text by "clicking" with the buttons 27 and positioning the cursor. Assume that the user first wants to replace a first piece of text with a second piece of text which is situated elsewhere in the text. The user presses one of the buttons 27 and passes the input unit 300 across the second piece of text to mark the same. Then he changes the input unit 300 to the control function mode and records the command indication "cut" by passing the input unit 300 across this command indication on the command field 120 of the mouse pad 100. The input unit 300 then sends the character-coded text "cut" to the signal-processing unit 210 in the computer 200, which identifies the text as a command indication and creates a corresponding command for the word processing application concerned, which cuts out the marked piece of text. The user next changes the input unit 200 to the mouse function mode and marks the first piece of text using the input unit 300 and then causes the computer 300 to paste the cut-out piece of text in place of the marked text by changing the input unit 300 to the control function mode and recording the command indication "paste" using the input unit 300.

Now assume that the user wants to enter text from a newspaper in his document. He first positions the cursor in the required place using the input unit 300 changed to the mouse function mode. Then he changes the input unit 300 to the scanner function mode and scans the text from the newspaper. The text is converted into character-coded format and transmitted to the signal-processing unit 230 which causes the computer 200 to insert the text in the position marked by the cursor.

Now assume that the user sees an interesting web address in the newspaper he is reading and wants to look at this web page. He then changes the input unit 300 to control function mode and reads off the web address from the newspaper. The recorded text is transferred to the signal-processing unit 210 which identifies the character combination "http://" and causes the computer 200 to open the web page with the recorded address.

Finally, assume that the user wants to send an e-mail to a friend. He uses the input unit 300 changed to the control function mode to record the command indication "e-mail" on the mouse pad 100. The recognition of this command indication by the signal-processing unit 210 results in the unit generating a command to the computer 200 which causes it to open the e-mail program. The user can then record the required e-mail address and even the content of the message using the scanner function.

As shown above, the user can conveniently carry out a number of different functions which comprise inputting information and controlling the computer 200 by means of just one input unit 300.

Of course, other functions can be integrated into the input unit 300 in order to further increase its usability. An example is a function to record handwritten text, which is described in the Applicant's Patent Publication No. WO99/60467, which is incorporated herein by reference.

Another example is a photographing mode, in which the input unit 300 via the buttons 27 can be caused to record single images and store these and/or transfer these to the computer 200. The lens system must be changed so that a sharp image on the sensor 8 is obtained at an infinite distance, or normally a distance of about two meters. In the scanner function mode and the mouse function mode, however, the lens system 7 is adjusted so that a sharp image is obtained of an object which is positioned at the window 2, i.e. normally about two centimeters from the sensor 8.

Moreover, other commands than those stated above can be generated. A user may also himself define how recorded text is to be interpreted by the signal processing unit recorded text is to result in.

It has been described above that the change between the different function modes takes place by the user pressing the buttons 27 on the input unit 300. As an alternative, the input unit 300 can itself detect that it is to change between different function modes.

Figure 2:
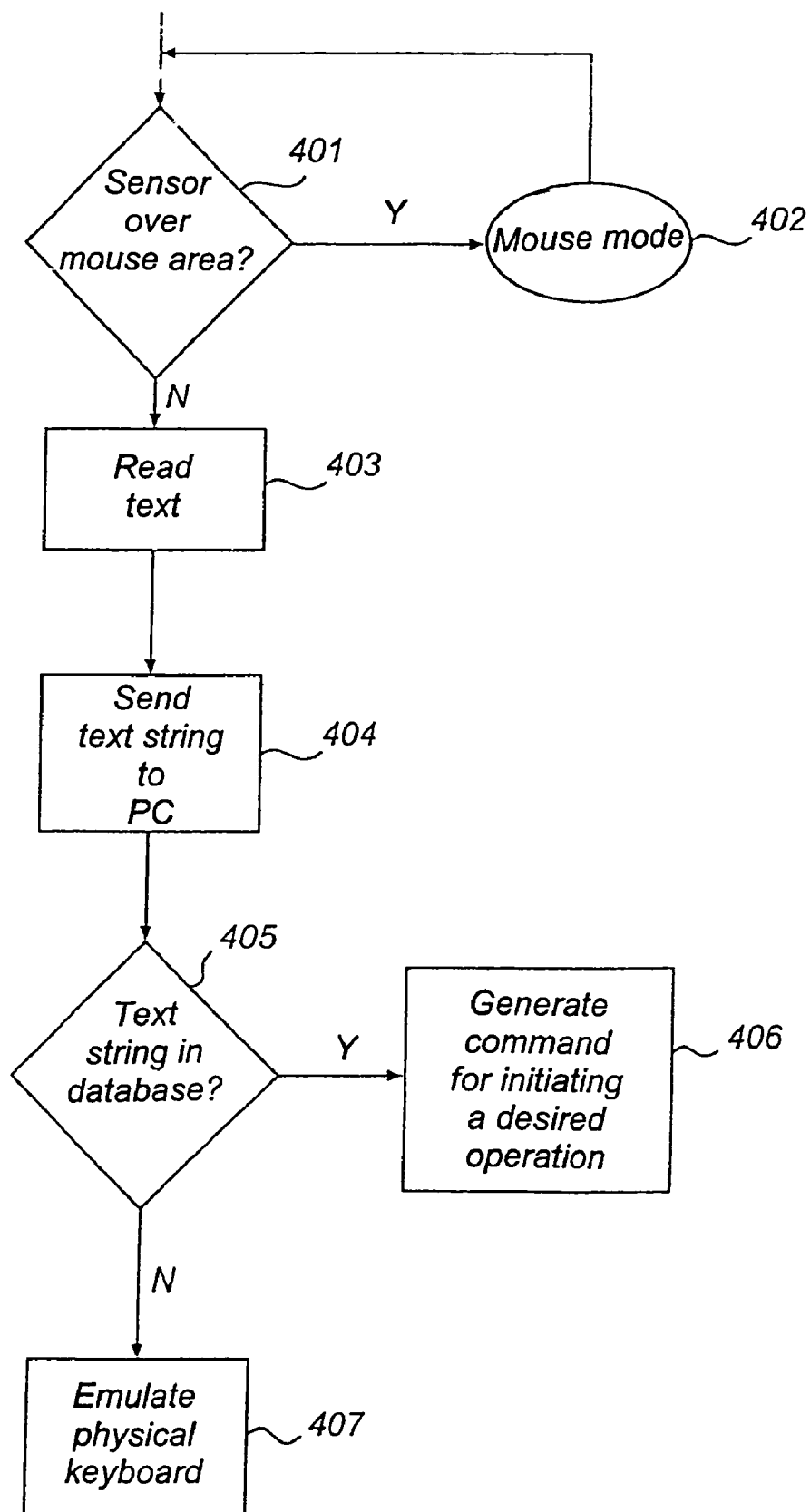
FIG. 2 is a simplified flow chart showing operations which are carried out in an arrangement similar to the one in FIG. 1.

FIG. 2 illustrates schematically a flow chart of the operations in such an alternative arrangement. The input unit 300 is arranged to search for predetermined information in each image recorded with the optical sensor 8 (step 401). The predetermined information can be, for example, the pattern on the working field 10 of the mouse pad 100. If the processor 20 detects this pattern, it changes to the mouse function mode (step 402) and processes the images in the manner described above to generate positioning signals to the cursor on the display 201 of the computer 200. If the user then places the input unit 300 on a newspaper in order to scan text, the processor 20 no longer detects the mouse pad pattern and then knows that it is to change to the scanner function mode (step 403) and processes the images in the manner described above for identification of text and conversion thereof to a character-coded text string. The text string is then transmitted to the computer 200 (step 404), in which the signal-processing unit 210 in this embodiment continually matches the received text strings to the contents of a database (step 405). In case of correspondence, the signal-processing unit 210 generates a command, corresponding to the text string, to the computer 200 (step 406), and otherwise, the text is inputted, if possible, to an application in the computer 200 (step 407). In this case, an automatic change between the scanner function mode and the control function mode thus takes place (step 405) by means of an intelligent filter. The intelligent filter in the signal-processing unit 210 analyses the format of the received text string for identification of control information. An e-mail address can, for example, be identified by the presence of an at sign, optionally in combination with its relationship with other given characters, and is interpreted as a command to open an e-mail program with the e-mail address entered in the address field. A web address can be identified by the presence of the character combination "http://" or "www", optionally in combination with its relationship with other given characters, and is interpreted as a command to open a web reader with the indicated address. A file address can, for example, be identified on the basis of the character combination ":\" in combination with a given finalizing file type indicator (".doc", ".exe", "mp3", etc.) and interpreted as a command to open a file by means of the program indicated by the file type indicator.

According to an alternative, the input unit 300 is actively controlled to the control function mode by the user, however, without using buttons. The command indications in the command field 120 of the mouse pad 100 in FIG. 1 can be written in a given manner, so that the processor 20 can detect that the inputted characters are not characters that are to be inputted into the computer according to the scanner function mode, but characters that represent a command and are to be sent to the signal-processing unit 210 to be processed as such. The command indications can be, for example, written in a special size, a special font or a special line thickness.

As another example, the change to the scanner function mode can be carried out on the basis of change commands which are written in the command field 120 of the mouse pad 100, as is evident from FIG. 1. When the user, for instance, wants to change to the scanner function mode he records by means of the input unit 300 the word "scanner" from the command field 120. The processor 20 identifies this as predetermined information which indicates that it is now to carry out a scanner function. Correspondingly, recording of the word "camera" from the command field 120 results in a change to the photographing mode.

The above description has been given with reference to a mouse pad and a computer. However, it will be appreciated that the arrangement is also usable in other cases, such as for controlling a mobile phone or a PDA. For instance, the input unit can be used to read, from a business card, a fax number, a phone number, an e-mail address or a web address and, on the basis thereon, cause the mobile phone or the PDA to connect to one of these addresses. In this context, it will appreciated that the input unit and the signal-processing unit can be an integrated part of the mobile phone or the PDA.

Reverting to the mouse pad in FIG. 1, it was stated above that the pattern on the same is an irregular pattern and that the mouse function is achieved by determination of the relative positions of the recorded images. In another embodiment, the pattern on the mouse pad 100 can be a position-coding pattern, which systematically codes positions over the whole mouse pad 100. In this case the mouse function can be based on reading off positions using the position-coding pattern. In addition the change to the mouse function mode can be based on recognition of the position-coding pattern. In addition particular positions or position areas (also called domains or regions), for example those corresponding to the different command indications in the command field 120, can be dedicated to particular function modes. When the processor detects a particular position, it determines which function corresponds to this position. In this way the input unit 300 can be caused to change from one function mode to another function mode by placing it in a particular position on the mouse pad. Different regions of the position-coding pattern can also be dedicated to commands for controlling the computer 200. Instead of the signal-processing unit in the computer 200 detecting predetermined information in the text which is entered, it can thus detect positions in the form of coordinates and identify which command is to be created to control the computer 200. For example, if the user wants to open the e-mail program in the computer 200, he can place the input unit 300 on the mouse pad 100 in a position where it says "e-mail". The optical sensor 8 records an image of the position coding pattern in this position. The processor 20 identifies which position, that is which coordinates, corresponds to the position-coding pattern in the image. It sends the coordinates to the signal-processing unit 210 in the computer 200. The signal-processing unit 210 identifies that these coordinates mean that it is to create a command to the computer 200 which causes it to open the e-mail program. In this case, the message "e-mail" is only an indication to the user to which command the field corresponds while the actual operation triggered by the input unit 300 is determined by the position-coding pattern. The advantage of this arrangement is that the input unit need not subject a text to character recognition (OCR), with the ensuing risk of misinterpretation.

The mouse pad can thus be divided into position areas or regions which are associated with different functions or commands. An additional example of this is that one region can he dedicated to a relative mouse function mode (the cursor is moved in the same way as the input unit) and another region to an absolute mouse function mode (the cursor is placed in the position which corresponds to the position of the input unit on the mouse pad). The input unit itself understands which function it is to use on the basis of whether the position-coding pattern (and hence the identified coordinates) belongs to one or the other region.

Of course, alternatively the same surface can be used for the relative and the absolute function mode and the change can be carried out by means of change commands in the way described above.

A further example is that the mouse pad can have an area which is dedicated to a scrolling function. The input unit can thus be a mouse with various mouse functions. It can also be a mouse which, in addition to controlling a cursor on a display, can control other functions of a computer or other electronic devices, such as a mobile telephone or a PDA.

The above description is just one example of how the arrangement according to the invention can be designed. Based on the summary of the invention, experts in the field can achieve a number of variants of this example within the scope of the appended claims.

The invention claimed is:

1. A system for controlling an electronic device, said system comprising an input unit with an optical sensor for recording images, and a signal-processing unit for identifying predetermined information in at least one of said images and for controlling the electronic device dependent upon said predetermined information, wherein the input unit in a first function mode is arranged to convert said at least one image to a current text string containing a sequence of characters, and that the signal-processing unit is arranged to control the electronic device on the basis of the current text string.

2. A system according to claim 1, wherein the signal-processing unit is arranged to control the electronic device on the basis of the format of the current text string.

3. A system according to claim 2, wherein the signal-processing unit is arranged to match the format of the current text string to a format database comprising predetermined formats, each of which is associated with at least one command, and to generate the command associated with the current text string, so as to control the electronic device.

4. A system according to claim 3, wherein said command initiates execution of software on the electronic device.

5. A system according to claim 3, wherein said format database comprises predetermined formats of different types of addresses.

6. A system according to claim 3, which further comprises a database editor which allows a user to add formats and associated commands to the format database.

7. A system according to claim 1, wherein the signal-processing unit is arranged to identify an address in the current text string and to cause the electronic device to connect to said address.

8. A system according to claim 1, wherein the signal-processing unit is arranged to cause, when identifying an address for electronic mail in said text string, the electronic device to open a program for electronic mail.

9. A system according to claim 1, wherein the signal-processing unit is arranged to cause, when identifying a web address in said text string, the electronic device to open a web browser.

10. A system according to claim 1, wherein the signal-processing unit is arranged to cause, when identifying a phone or fax number in said text string, the electronic device to connect to the phone or fax number.

11. A system according to claim 1, wherein the input unit in the first function mode is a handheld text scanner.

12. A system according to claim 1, which is selectively operable in a control function mode, in which the signal-processing unit is arranged to control the electronic device on the basis of the current text string.

13. A system according to claim 1, wherein the signal-processing unit is at least partly placed in the same casing as the electronic device.

14. A system according to claim 1, wherein the input unit is arranged for wireless communication with the electronic device.

15. A system according to claim 1, wherein the input unit in a further function mode is controllable to record single images.

16. A system according to claim 15, wherein the input unit is arranged to automatically select a predefined function mode, preferably the first function mode, in the absence of a predetermined pattern in said at least one image.

17. A system according to claim 1, wherein the input unit in a second function mode is arranged to control a cursor on a display of the electronic device.

18. A system according to claim 17, wherein the input unit is arranged to automatically select function mode on the basis of the contents of said at least one image.

19. A system according to claim 17, wherein the input unit is arranged to operate in the second function mode when said at least one image contains a predetermined pattern.

20. A system according to claim 19, wherein the predetermined pattern consists of a position-coding pattern, preferably an absolute position-coding pattern.

21. A system according to claim 1, which further comprises a product, on which a plurality of command words are indicated.

22. A method for controlling an electronic device, comprising:
operating a handheld input unit to record at least one image, identifying predetermined information in said at least one image, and controlling the electronic device dependent upon said predetermined information, Wherein converting said at least one image to a current text string including a sequence of characters, and controlling the electronic device on the basis of the current text string.

23. A method according to claim 22, further comprising controlling the electronic device on the basis of the format of the current text string.

24. A method according to claim 23, further comprising matching the format of the current text string to a format database comprising predetermined formats, each of which is associated with a command, and generating the command associated with the current text string to control the electronic device.

25. A method according to claim 24, wherein said command initiates execution of software on the electronic device.

26. A method according to claim 24, wherein the format database comprises predetermined formats for different types of addresses.

27. A method according to claim 22, further comprising searching for an address in the current text string, and, when an address is found, causing the electronic device to connect to said address.

28. An input unit with at least a first and a second function mode, comprising a detector for capturing images and an image processor for processing the images to achieve said two function modes, wherein the input unit is arranged to change from the first to the second function mode when the image processor detects a first piece of predetermined information in one of said images.

29. An input unit according to claim 28, wherein said first piece of predetermined information is a predetermined pattern.

30. An input unit according to claim 28, which is arranged to change from the second function mode to the first function mode when it detects a second piece of predetermined information in one of said images.

31. An input unit according to claim 28, wherein said predetermined information consists of a position-coding pattern.

32. An input unit according to claim 28, wherein the first function mode is a mouse function, and the second function mode is an input function.

* * * * *